Dec. 16, 1958  H. J. HALL ET AL  2,864,456
AUTOMATIC CONTROL FOR ELECTRICAL PRECIPITATORS
Filed Aug. 2, 1955  2 Sheets-Sheet 1
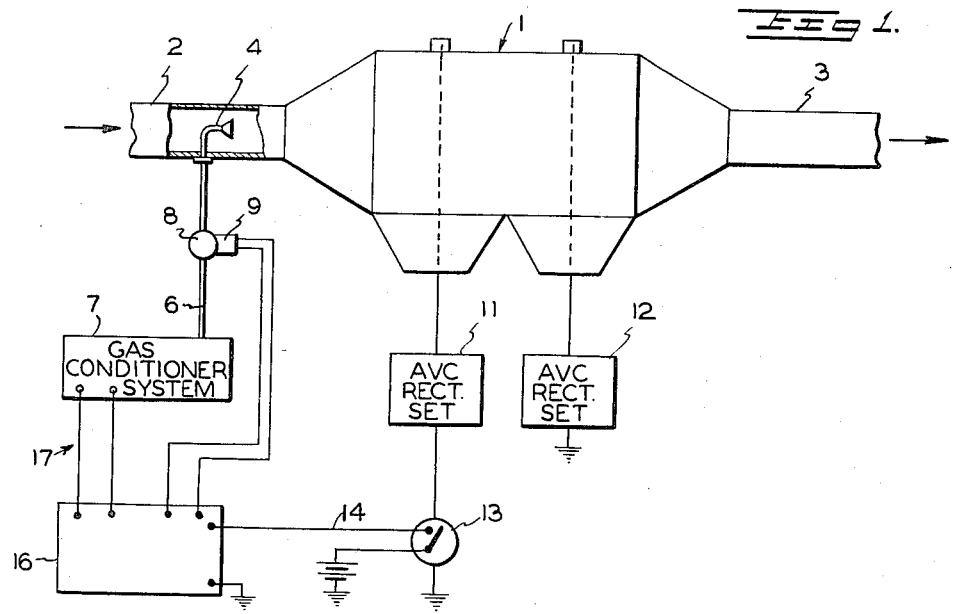
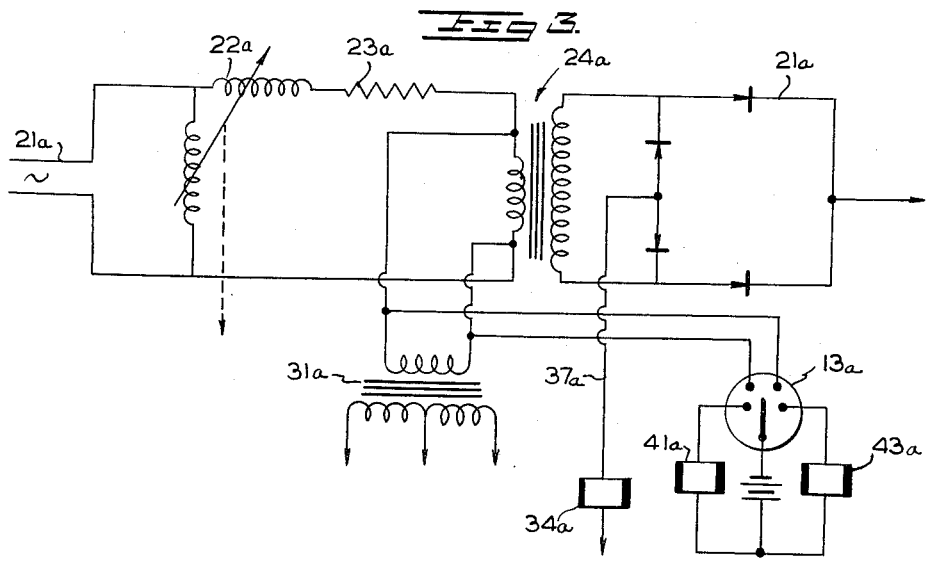
INVENTORS
HERBERT J. HALL &
HARRY J. WHITE
BY Harold T. Stowell
ATTORNEY

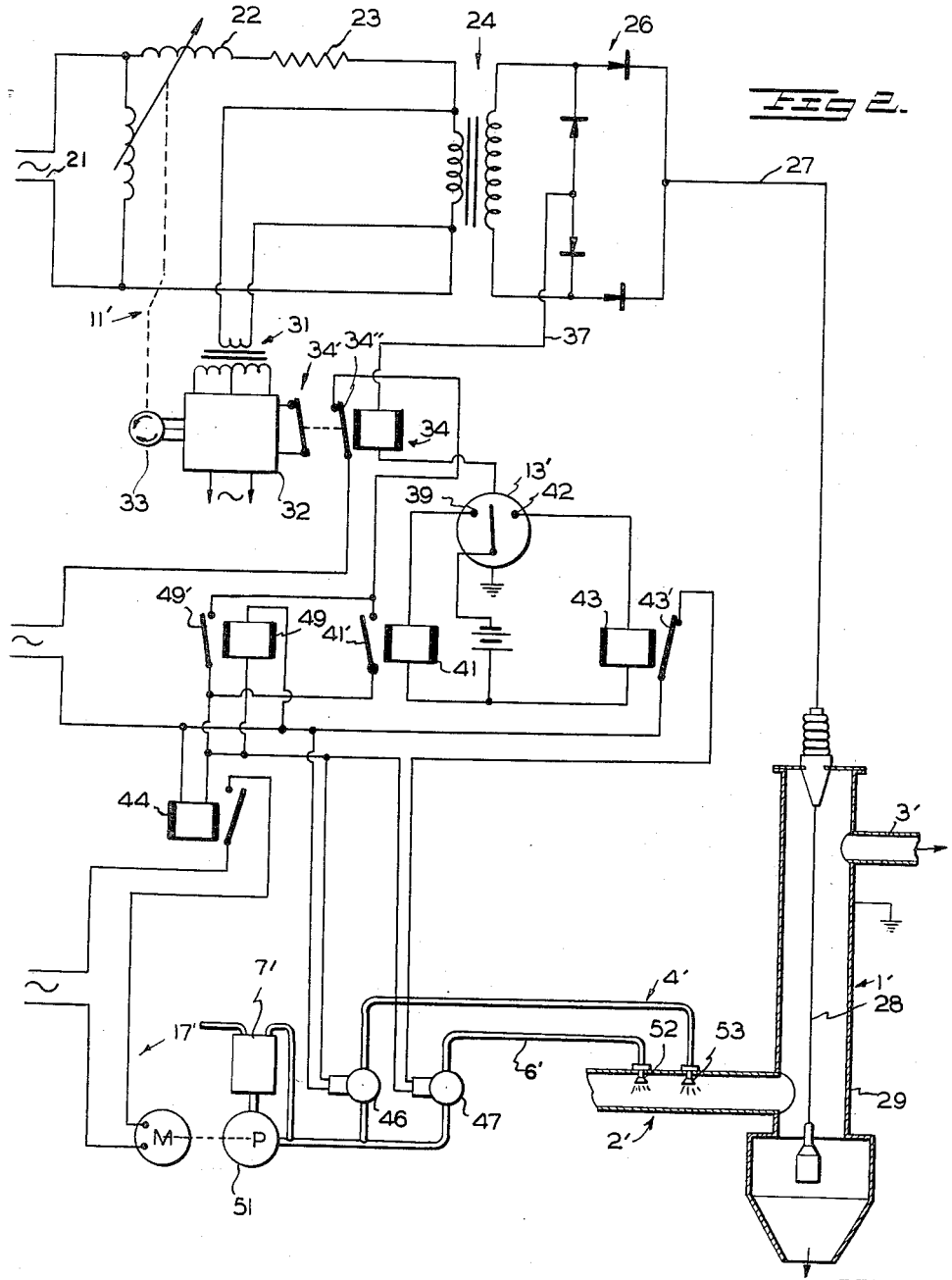

United States Patent Office 2,864,456
Patented Dec. 16, 1958

2,864,456

AUTOMATIC CONTROL FOR ELECTRICAL PRECIPITATORS

Herbert J. Hall, Princeton, and Harry J. White, Basking Ridge, N. J., assignors to Research Corporation, New York, N. Y., a corporation of New York Application August 2, 1955, Serial No. 525,924

9 Claims. (Cl. 183—7)

This invention relates to electrostatic precipitator systems and more particularly to such systems employing conditioning agents such as dusts, liquids or gases, to change the electrical properties of the material being cleaned so as to increase the efficiency of precipitation when required by operating conditions.

Gas conditioning systems are known for adding a conditioning agent to dirty gas prior to subjecting it to the action of a precipitator. It is a primary object of the invention to improve the operation of a precipitator system by controlling the gas conditioning in accordance with the precipitator sparking rate and the precipitator current in such fashion as to insure high efficiency of precipitation under all operating conditions. To this end, automatic control of gas conditioning is combined according to the invention with automatic voltage control of the precipitation voltage, the automatic control of the conditioning agent being in accordance with the precipitator sparking rate and the precipitator load current or in accordance with sparking rate and precipitator voltage.

The automatic voltage control may be in accordance with known systems, such as, for example, that disclosed in U. S. Patent 2,675,092 to Herbert J. Hall, and will automatically regulate the precipitator voltage to maintain the desired optimum sparking rate for best efficiency. However, if the gas being cleaned contains high resistivity materials, the precipitator rectifier current is reduced by the automatic voltage control action below the minimum value required to achieve the desired precipitator collection efficiency. When this occurs, the gas conditioning system is turned on, which increases the conductivity of the suspended material in the precipitator section, so that the current tends to rise. When the current exceeds another somewhat higher predetermined value, the conditioning system is automatically turned off. As long as the current remains within the predetermined limits at the optimum sparking rate, the conditioning system is kept operative. However, for maximum efficiency, regulation of the amount of conditioning agent according to the requirements of the system is also necessary. The amount of conditioning agent needed will depend on the resistivity and concentration of the dust being treated. Means are therefore provided according to the invention, for also controlling the amount of conditioning agent added, as well as the duration of this process. In this manner, the system provides conditioning only when necessary and during that time provides the proper amount for minimum operating cost. The use of automatic voltage control in combination with the conditioning system ensures that the precipitator electrical energization is continually maintained at the highest possible level consistent with best collection efficiency for the prevailing conditions. The automatic voltage control system, in essence, determines when it is necessary to supply conditioning agent in order to ensure that the collection efficiency will not fall below a predetermined level.

The specific nature of the invention, as well as other objects and advantages thereof will clearly appear from a description of a preferred embodiment as shown in the accompanying drawings, in which:

Fig. 1 is a highly schematic diagram illustrating the principle of the invention;

Fig. 2 is a schematic circuit diagram showing in greater detail a preferred embodiment of the invention according to Fig. 1; and Fig. 3 is a modification of Fig. 2, using a voltage-sensing meter instead of a current-sensing meter.

Referring to Fig. 1, a two-section precipitator 1, having a gas inlet at 2 and a clean gas exit at 3, is provided at its inlet end with gas conditioning means 4 which may typically be one or more high-pressure fog spraying nozzles for adding a fine mist of water or other suitable liquid conditioning agent to the incoming dirty gas. Alternatively, a conductive dust such as carbon black or coal dust may be used, or a suitable gas or vapor, such as steam, the preferred conditioning agent depending upon the nature of the material being treated. The conditioning agent may be supplied through pipe 6 from any suitable gas conditioner apparatus 7, which may be a tank containing the conditioning agent together with a pump for supplying the agent under pressure to nozzle 4. An electrically controlled valve 8 is provided in supply pipe 6, and may be controlled by any suitable electrical means such as solenoid 9.

The above described gas conditioning system is automatically controlled by a current derived from the first high-voltage precipitation electrode system, which is provided with automatic voltage control means 11, of known type; a similar automatic voltage control set 12 is provided for the second stage of the precipitator. For this purpose, an ammeter 13 is shown, the current in which is proportional to the operating current of the first section of the precipitator, which is, of course, responsive to the operating conditions within the precipitator. If this current drops below a predetermined minimum due to high resistivity of the material being treated, circuit 14 is closed, which energizes timing and control circuit 16, which will be described in more detail below. Operation of this circuit controls the on-off condition of the gas conditioning system through line 17, and also controls the amount of conditioning agent delivered through valve 8.

Fig. 2 shows in more detail a system according to Fig. 1. Elements in Fig. 2 which correspond generally to those in Fig. 1 are given the same number with a prime (') added. The alternating current voltage supply for the precipitator is indicated at 21, and is controlled by any suitable voltage regulator 22 and ballast resistor 23. The usual high tension transformer 24 is provided, and a suitable rectifying system indicated at 26, which may be of any known type, either mechanical or electrical. The rectified high voltage output passes on line 27 to the discharge electrode 28 of precipitator 1', and returns from the collector electrode 29 through millimeter 13' to the rectifying circuit 26.

An automatic voltage control system which controls the precipitator voltage in accordance with the sparking rate is generally indicated at 11', and comprises a transformer 31 whose primary voltage is derived from the input voltage to the primary of high voltage transformer 24 and which therefore responds to sparking conditions in the precipitator as described in U. S. patent application Serial No. 414,003 filed March 4, 1954 now Patent 2,752,000 dated June 26, 1956 by Herbert J. Hall. The electronic integrating and automatic voltage control system of U. S. Patent 2,675,092, 32, drives a reversible electric motor 33 in accordance with sparking conditions at the precipitator to accordingly raise or lower the input voltage by means of regulator 22, driven by reversible motor 33, to maintain the sparking rate within predetermined limits. A limit relay 34 is provided to open the control circuit contacts 34' of the automatic voltage control system whenever the current in precipitator circuit 37 rises to a predetermined value.

The contacts on the contact-making D.-C. millimeter 13' are set to suitable values according to the particular application. For example, suppose normal precipitator efficiency is achieved at a current of 150–180 ma. with an average sparking rate of 50 per minute, but under certain conditions, due to high ash resistivity, the current may be limited to as little as 50 ma. with the above sparking rate. Assume the low-current contact 39 is set to energize relay 41 and close relay contacts 41' at 145 ma., and the high-current contact 42 is set to energize relay 43 and open relay contacts 43' at 200 ma., and the automatic voltage control limit relay 34 is set to open contacts 34' and 34'' at 230 ma. Let us assume that operating conditions in the precipitator are such that the automatic voltage control system reduces the current below 150 ma. due to excessive sparking caused by high ash resistivity. In lieu of an automatic conditioning system such as that shown, the collection efficiency would then fall below the desired level. However, at 145 ma. the contacts of relay 41 close and relays 44, 46, 47, and 49 are energized via normally closed contacts 34'' and 43'. These relays are held energized by holding contact 49', since relay 49 remains closed until the millimeter engages contact 42 to energize relay 43. Contact 49' may be a holding contact associated with relay 44, in which case relay coil 49 can be eliminated. When relay 44 is closed, as above described, the metering pump unit 51 comprising motor M and pump P is started and solenoid valves 46 and 47 are opened. The conditioning agent is then fed through pipes 6' and 4' to the dispersing nozzles 52 and 53 suitably located in the inlet flue to the precipitator. The maximum rate of delivery of the conditioning agent may be set by the metering pump 51 according to application requirements. For simplicity, two sets of injection nozzles are shown; additional distribution nozzles may be used as desired. Having thus conditioned the dust and gases entering the precipitator, the precipitator sparking will begin to decrease and the automatic voltage control action will raise the precipitator voltage accordingly until the current once again rises above the critical assumed value of about 150 ma., thus restoring the normal collection efficiency of the precipitator. Over a period of time, due to subsequent process changes perhaps, or due to the building up of a progressively better conducting precipitate with continued application of the conditioning agent, the precipitator electrical conditions may become sufficiently improved to permit an even higher electrical energization and consequently a higher collection efficiency. In this case, the automatic voltage control system 11' will increase the precipitator voltage in order to maintain the previously set value of 50 sparks per minute. If in this process the precipitator current should increase to 200 ma., whereupon the contact-making closure of contact 42 on meter 13' energizes relay 43, solenoid valve 47 will close as a result of opening the circuit through contact 43'. The supply of conditioning agent will now be reduced. As long as operating conditions within the precipitator permit the current to stay above 200 ma., system conditions will remain as described with a reduced flow of conditioning agent. If, however, the sparking should cease altogether or become sufficiently reduced to permit automatic voltage control action to increase the degree of electrical energization up to the rated capacity of the rectifier circuit, the automatic voltage control limit relay will become energized at the rated current of 230 ma., thus opening the contacts 34' and 34''. The former system prevents any further increase in current; the latter shuts off the conditioning system, obviously no longer required.

Fig. 3 shows a modification of the system of Fig. 2, in which the control is based on a combination of sparking rate and voltage, instead of sparking rate and current, as in Fig. 2. The chief distinction from Fig. 2 is that instead of the contact-making ammeter 13' of Fig. 2, a contact-making voltmeter connected across the primary of the high-voltage transformer is used. Corresponding elements in Fig. 3 have the same reference characters as in Fig. 2, with the subscript $a$ added. It will be seen that voltmeter 13a responds to the primary voltage to control the operation of the pump and valves of the conditioning system instead of ammeter 13' of Fig. 2, the operation being otherwise similar to that previously described.

By means of either of the above systems, precipitator operation is automatically and continuously maintained at or above a given design collection efficiency under variable load conditions, including the conditions requiring the use of a conditioning agent to maintain the electrical conductivity of the precipitate at satisfactory values.

Within the above objective, continuously maximum precipitator collection efficiency is maintained by automatically regulating the precipitator operating voltage and the application of conditioning agent at optimum levels as determined by either a combination of precipitator sparking rate and current or by a combination of precipitator sparking rate and voltage. Furthermore, a system and means are provided for use with a wide variety of gaseous or liquid conditioning agents, as well as solid particulate agents.

In considering the choice of sparking rate and current versus sparking rate and voltage for the basic control parameters, it is noted that:

(1) For materials of moderately high resistivity, i. e., the order $10^{10}$ to $10^{11}$ ohm-cm., below the region of stable, high-current back corona, the combination of precipitator sparking rate and precipitator load current seems best suited. It may be noted that a large number of important field problems are encountered among materials in this category—fly ash collection installations, for example.

(2) For very high-resistivity materials, that is, of the order $5 \times 10^{11}$ or above, where precipitator operation may be generally characterized by a stable, high-current back corona, the combination of precipitator sparking rate and precipitator voltage may be more appropriate for the control parameters.

It will be apparent that the embodiments shown are only exemplary and that various modifications can be made in construction and arrangement within the scope of our invention as defined in the appended claims.

We claim:

1. In combination with an electrostatic precipitator for cleaning gas, voltage control means for continuously energizing said precipitator for automatically varying the precipitator voltage to maintain a predetermined range of sparking rate, distributing means for adding a conditioning agent to the gas to be cleaned, means for sensing an electrical parameter of the precipitator charging circuit and means responsive to said sensing means for actuating said conditioning agent distributing means to maintain said electrical parameter within a predetermined range.

2. The invention according to claim 1, said sensing means being current responsive means, and circuit means actuated by said current responsive means for initiating operation of said distributing means.

3. The invention according to claim 2, and further means actuated by said sensing means for reducing the amount of conditioning agent added when the precipitator current exceeds a predetermined value.

4. The invention according to claim 3, said conditioning agent being a liquid, and said distributing means comprising a pump and spray means for introducing a spray of conditioning liquid into the gas stream.

5. The invention according to claim 4, said spray means comprising a plurality of spray units and said further means comprising means for cutting off some of said spray units.

6. The invention according to claim 1, said sensing means being voltage responsive means and said electrical parameter being the precipitator voltage, and circuit means actuated by said voltage responsive means for initiating operation of said distributing means.

7. An electrostatic precipitator system comprising gas inlet duct means for dirty gas, and electrostatic precipitator chamber containing discharge electrode means, and a clean gas outlet duct; supply means for said precipitator comprising a high voltage step-up transformer supplied by a source of alternating current, means for rectifying the high voltage output of said transformer and supplying said output to said discharge electrodes; controllable means for adjusting the alternating current voltage supplied to said transformer in accordance with the sparking rate of said precipitator; means for sensing an electrical parameter of the precipitator charging circuit; distributing means for adding a conditioning agent to the gas in said inlet duct means, comprising supply means for supplying said agent and valve means for controlling the supply of said agent to said inlet duct means; relay means actuated by said sensing means at a predetermined low value of said parameter for initiating operation of said supply means and for opening said valve means; means for maintaining said operating condition of the supply and valve means until said parameter increases to a predetermined value; second relay means operated by said sensing means at said predetermined value for controlling said valve means to reduce the supply of conditioning agent; and third relay means responsive to precipitator voltage to stop operation of said supply means and to completely close said valve means when the precipitator voltage exceeds a maximum predetermined value.

8. The invention according to claim 7, said parameter being precipitator discharge electrode current.

9. The invention according to claim 7, said parameter being precipitator voltage.

References Cited in the file of this patent

UNITED STATES PATENTS

| 1,909,825 | Hahn et al. | May 16, 1933 |
| 2,771,150 | Welts | Nov. 20, 1956 |

FOREIGN PATENTS

| 377,343 | Germany | June 16, 1923 |
| 568,123 | Germany | Jan. 14, 1933 |